US012523926B2

(12) United States Patent
Ryan

(10) Patent No.: US 12,523,926 B2
(45) Date of Patent: Jan. 13, 2026

(54) TRAIL CAM MOUNTING APPARATUS AND METHOD

(71) Applicant: Michael William Ryan, Festus, MO (US)

(72) Inventor: Michael William Ryan, Festus, MO (US)

( * ) Notice: Subject to any disclaimer, the term of this patent is extended or adjusted under 35 U.S.C. 154(b) by 136 days.

(21) Appl. No.: 18/608,824

(22) Filed: Mar. 18, 2024

(65) Prior Publication Data

US 2024/0310700 A1    Sep. 19, 2024

Related U.S. Application Data

(60) Provisional application No. 63/453,091, filed on Mar. 18, 2023.

(51) Int. Cl.
*G03B 17/56*      (2021.01)

(52) U.S. Cl.
CPC ...... *G03B 17/561* (2013.01); *G03B 2217/002* (2013.01)

(58) Field of Classification Search
CPC ................. G03B 17/56; G03B 17/561; G03B 2217/002; A45C 5/12
See application file for complete search history.

(56) References Cited

U.S. PATENT DOCUMENTS

| | | | |
|---|---|---|---|
| 8,506,158 B2 | 8/2013 | Keung et al. | |
| 10,362,855 B2 | 7/2019 | Whang et al. | |
| 2014/0128751 A1 | 5/2014 | Donaldson | |
| 2015/0119963 A1 | 4/2015 | Cosse | |
| 2019/0227414 A1* | 7/2019 | Umphries | ........... A01M 31/002 |

FOREIGN PATENT DOCUMENTS

GB      2447421 A   *   9/2008      ........... A45F 5/1508

* cited by examiner

*Primary Examiner* — Minh Q Phan
(74) *Attorney, Agent, or Firm* — HSML P.C.

(57) ABSTRACT

An apparatus is provided for facilitating the attachment of a trail camera to a tree or other outdoor object. The apparatus includes a plurality of bistable bands arranged parallel to one another and a flexible cover enclosing the plurality of bistable bands. Each of the bistable bands has respective first and second mechanically stable shapes. The first mechanically stable shape is substantially linear and the second mechanically stable shape is arcuate or coiled. Each of the bistable bands has a spring force when moving from the first mechanically stable shape to the second mechanically stable shape. The cover and plurality of bands are arranged such that the spring forces of the plurality of bistable bands are cumulative, and thus the apparatus provides adequate wrapping and holding strength to secure the camera to the tree or other object.

13 Claims, 8 Drawing Sheets

TRAIL CAM MOUNTING APPARATUS AND METHOD

CROSS-REFERENCE TO RELATED APPLICATION

This application claims the benefit of U.S. Provisional Patent Application No. 63/453,091, filed Mar. 18, 2023, and which is hereby incorporated by reference in its entirety.

TECHNICAL FIELD

This disclosure relates to bands for mounting cameras to outdoor objects.

BACKGROUND OF THE INVENTION

Hunters, landowners, etc. often desire to capture photographic images of a particular place when nobody is present. For example, hunters may want to be made aware of the presence of certain game animals in a particular location, landowners may want to record any activity that takes place at a certain location, etc.

Certain specialty cameras, known by those skilled in the art as "trail cameras" or "game cameras," include sensors that are configured to detect the presence of certain conditions; the trail cameras automatically record images and/or video automatically in response to the sensors detecting certain conditions. For example, the sensors may detect motion, heat (via infrared sensors), etc. Trail cameras are typically enclosed in a rugged and waterproof housing.

Trail cameras need to be positioned at the proper height to capture an effective photographic image. Furthermore, a trail camera should be mounted in a secure location where damage to the camera is unlikely. Moreover, it is often desirable for a trail camera to be inconspicuous so that game animals are not wary of its presence.

SUMMARY

An apparatus is provided for facilitating the attachment of a trail camera to a tree or other elevated object. The apparatus includes a plurality of bistable bands arranged parallel to one another and a flexible cover enclosing the plurality of bistable bands. Each of the bistable bands has respective first and second mechanically stable shapes. The first mechanically stable shape is substantially linear and the second mechanically stable shape is arcuate or coiled. Each of the bistable bands has a spring force when moving from the first mechanically stable shape to the second mechanically stable shape. The cover and plurality of bands are arranged such that the spring forces of the plurality of bistable bands are cumulative, and thus the apparatus provides significant spring force when the bands move from the first stable position to the second stable position. The apparatus provides adequate wrapping and holding strength to secure the camera to the tree or other object.

The mechanical behavior of the bistable bands is imparted to the apparatus as a whole, and the apparatus is thus characterized by first and second stable shapes, with the first stable shape of the apparatus being linear and the second stable shape of the apparatus being coiled.

A trail camera is attachable to the apparatus. The first and second stable shapes of the apparatus enable easy and rapid attachment of the apparatus to a tree or other object such as a post, fence, etc. A method of using the apparatus to attach a trail camera to an object includes placing the apparatus against the tree when the apparatus (and the bistable bands) is in its first mechanically stable shape, then applying sufficient force to the apparatus to cause the bistable bands to move toward their second mechanically stable shape. The movement of the bistable bands toward their second mechanically stable shape causes the apparatus to move toward its second mechanically stable shape. Movement of the apparatus toward its second stable shape results in the apparatus coiling around the object such that the apparatus exerts a compressive force on the object.

The apparatus may include a strap connected to the cover by loops, and a cam buckle or other fastener at one end of the strap to engage with the other end of the strap. Accordingly, the method may further include engaging the cam buckle with the strap to secure the strap in a manner in which the strap circumscribes the tree.

The bistable bands are characterized by first and second edges that extend longitudinally. In at least some of the bistable bands, the first and second edges are substantially linear except for concave segments formed therein. The concave segments of the edges may be arc shaped, and the concave segments in the first edge may align with concave segments in the second edge to form narrow segments of the band. These concave segments enhance the flexibility of the bands and, therefore, the apparatus, which helps the apparatus wrap around the object to secure the trail camera thereto.

The above features and advantages and other features and advantages of the present disclosure are readily apparent from the following detailed description of the best modes for carrying out the disclosure when taken in connection with the accompanying drawings.

DETAILED DESCRIPTION

Referring to the Figures, wherein like reference numbers refer to like components throughout, an apparatus 10 for securing a trail camera 14 to a tree 18 or other supporting object is schematically depicted. The apparatus 10 includes a band assembly 22 that includes at least one bistable band.

Figure 1:
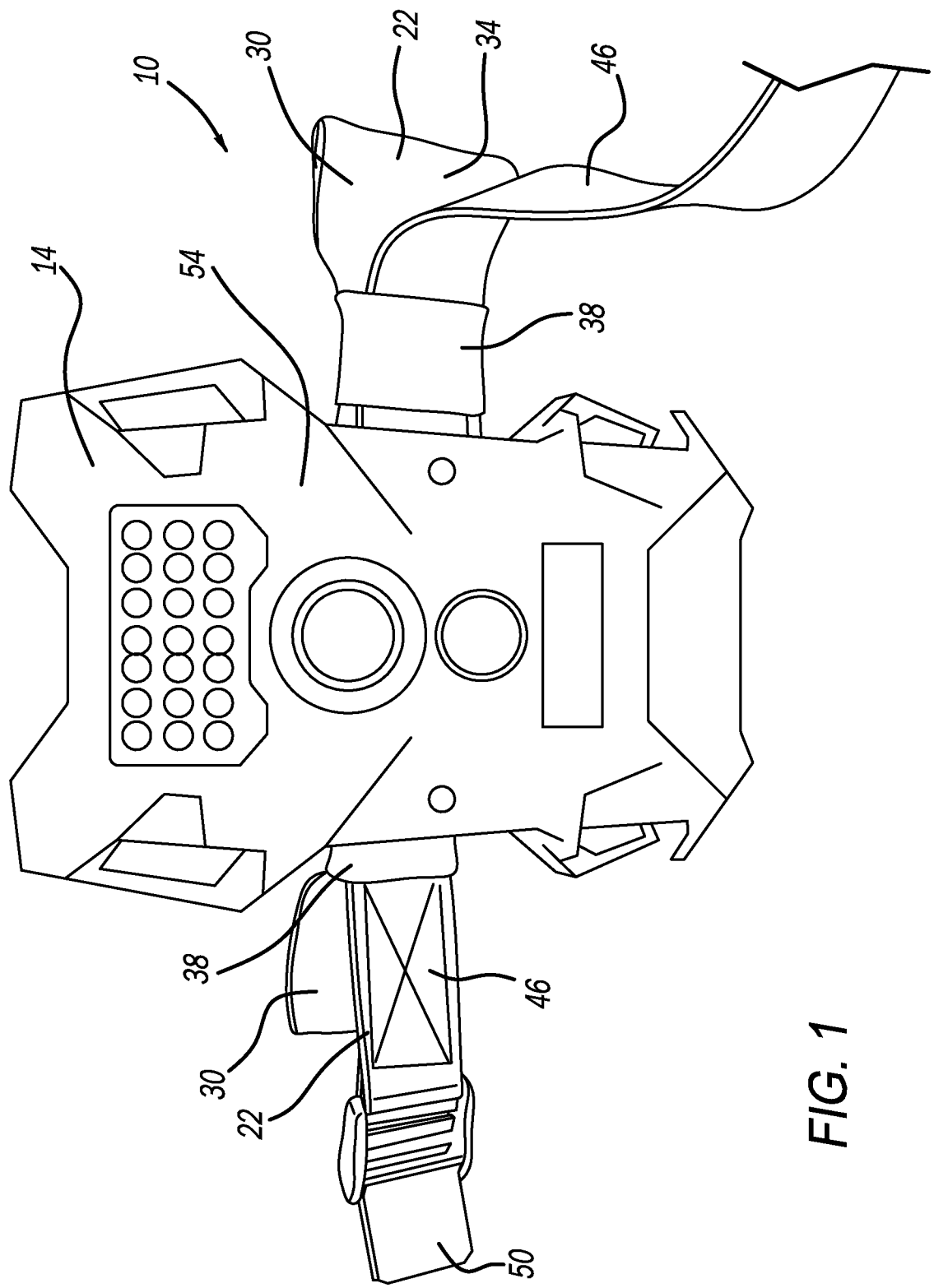
FIG. 1 is a schematic, front view of a mounting apparatus in a linear stable shape with a trail camera attached thereto.
Figure 2:
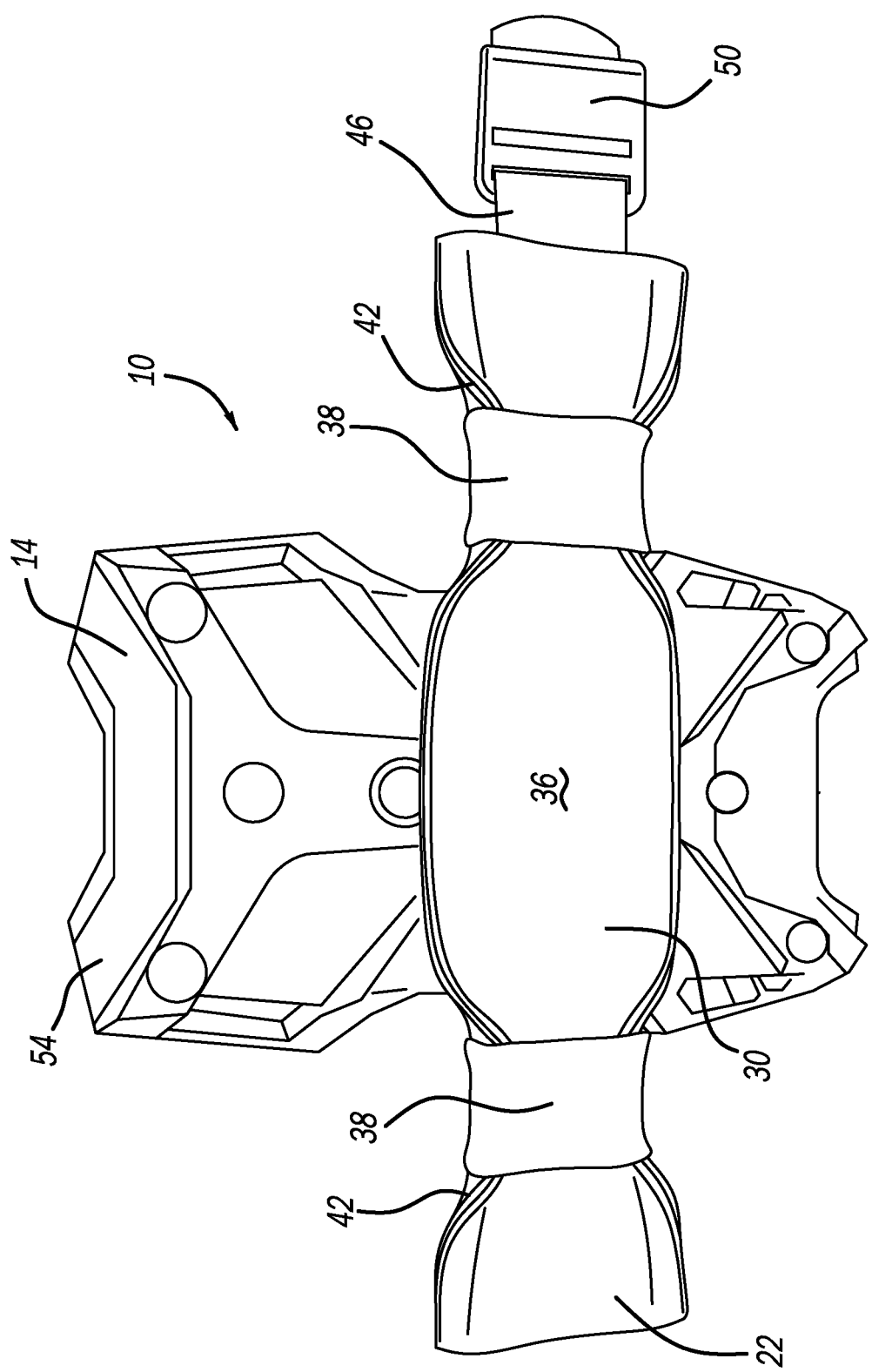
FIG. 2 is a schematic, rear view of the mounting apparatus and trail camera of FIG. 1.
Figure 3:
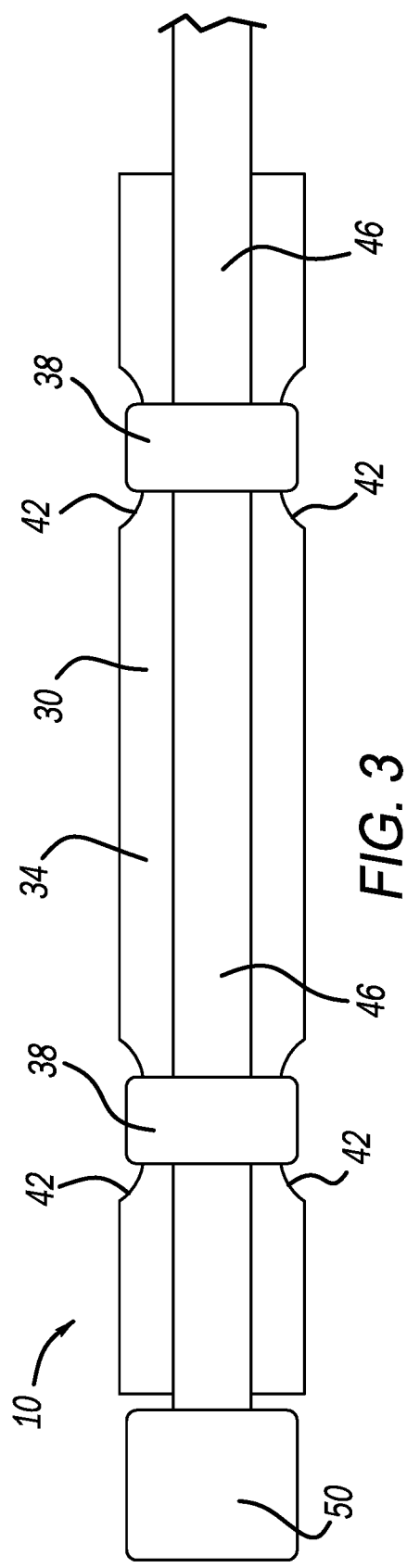
FIG. 3 is a schematic, front view of the mounting apparatus without the trail camera.
Figure 4:
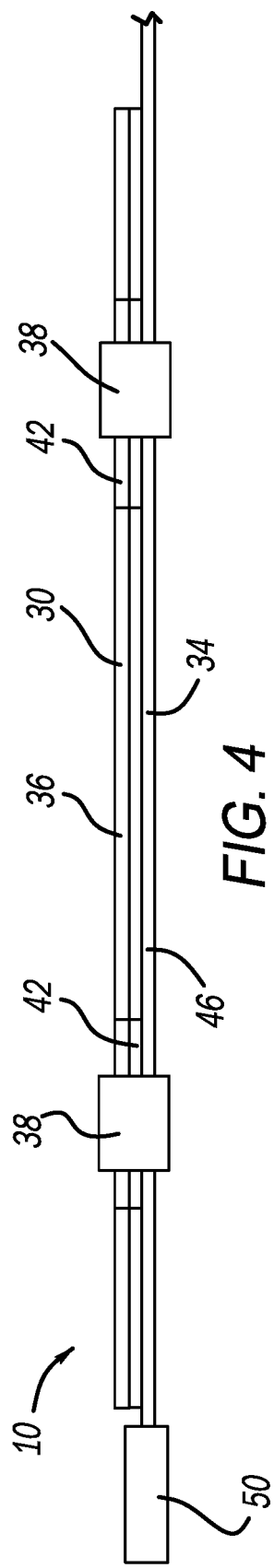
FIG. 4 is a schematic, top view of the mounting apparatus in the linear stable shape.
Figure 5:
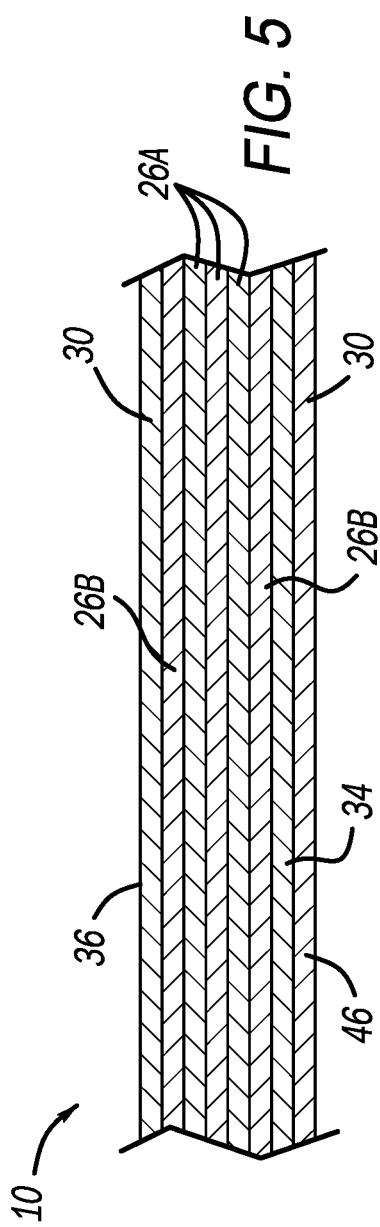
FIG. 5 is a schematic, cross-sectional, top view of a portion of the mounting apparatus showing a stack of bistable bands within a cover.
Figure 7:
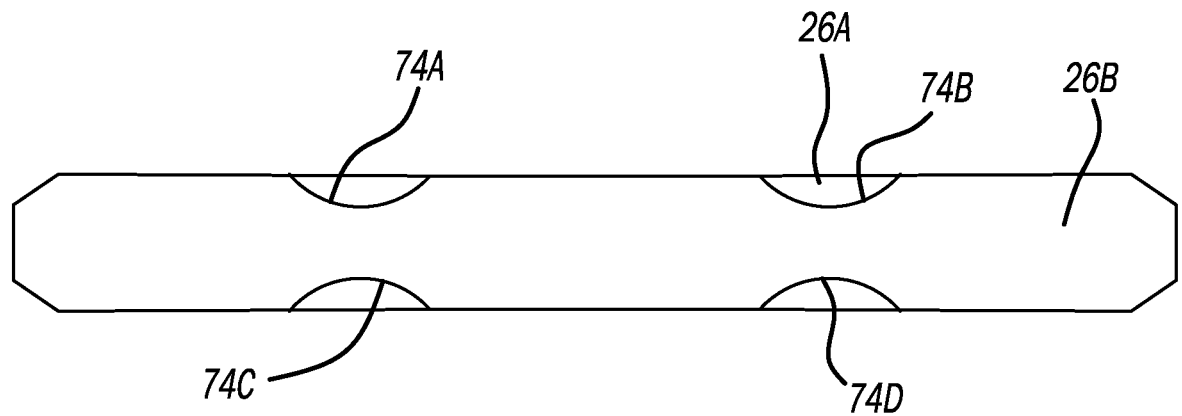
FIG. 7 is a schematic, front view of the stack of bistable bands.

In the embodiment depicted, the band assembly 22 includes five bistable bands 26A, 26B arranged in a stack, as best shown in FIGS. 5 and 7.

The apparatus 10 includes a flexible cover 30. In the embodiment depicted, the cover 30 includes two parallel panels or walls 34, 36 that are operatively connected to one another, such as by stitching. The stack of bistable bands 26A, 26B is located between the walls 34, 36 such that the cover 30 encloses the bands 26A, 26B and maintains the bands 26A, 26B in their stacked configuration. In one embodiment, the cover 30 comprises an elastic, flexible material and is eight inches long and one inch tall.

The apparatus 10 also includes two loops 38 that circumscribe the cover 30. In the embodiment shown, the loops 38 compress the cover 30 locally, forming concavities 42 in the upper and lower edges of the cover 30. The apparatus 10 further includes a flexible strap 46, which extends through the two loops 38, thereby connecting the strap 46 to the cover 30. A cam buckle 50 is mounted to one end of the strap 46. The opposite end of the strap 46 is insertable through the cam buckle 50 so that the strap 46 forms a loop; the cam buckle is selectively lockable so that the loop is maintained.

Figure 6:
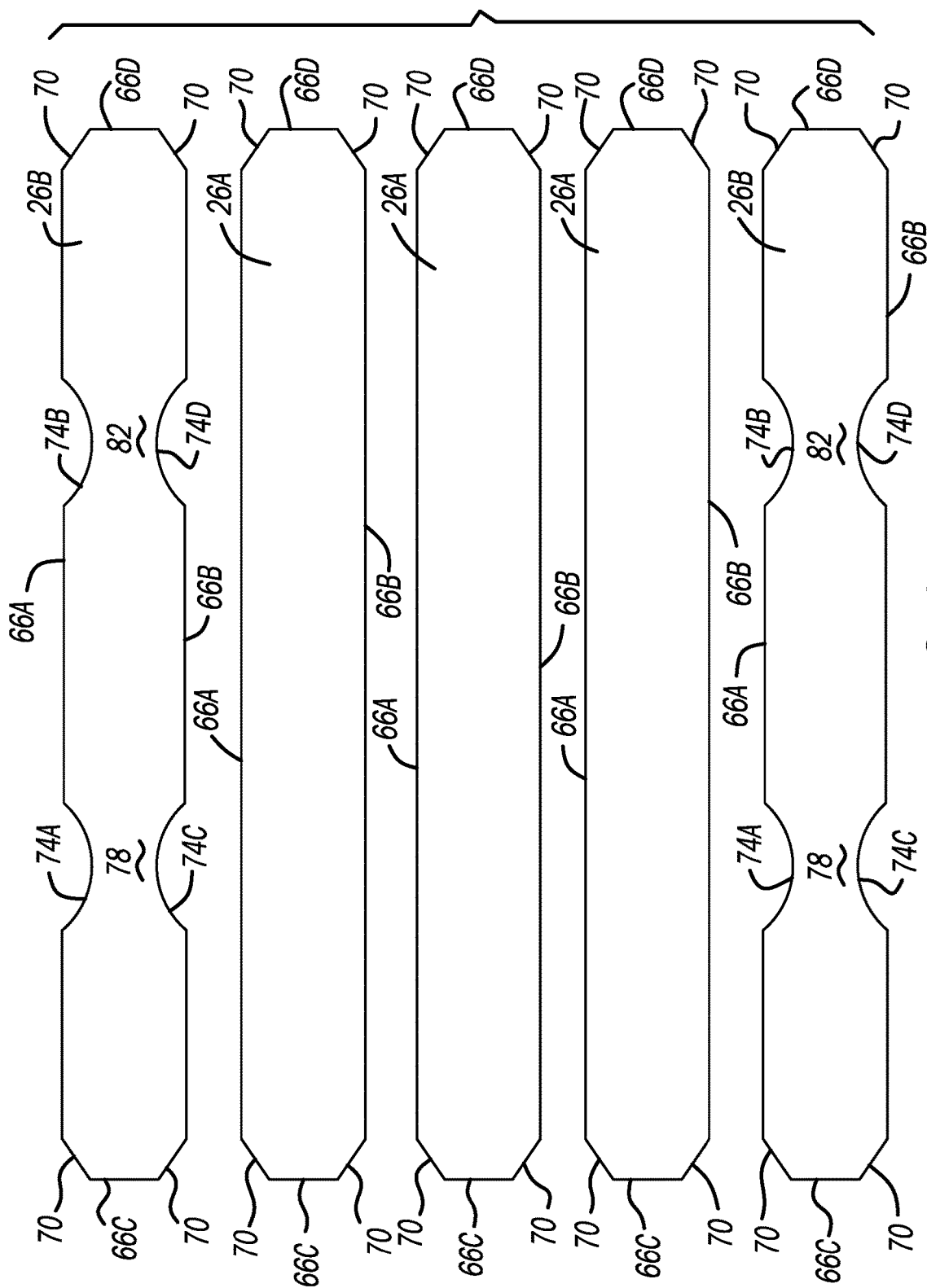
FIG. 6 is a schematic, exploded view of the stack of bistable bands.

The housing 54 of the trail camera 14 defines slots 58 through which the strap 46 is extendable to retain the camera 14 with respect to the apparatus 10. More specifically, the strap 46 extends through the loops 38 to secure the strap 46 relative to the cover 30 and bands 26A, 26B; the strap 46 extends through the slots 58 to secure the camera 14 to the strap 46. Referring specifically to FIGS. 6 and 7, each of the bands 26A, 26B includes first and second edges 66A, 66B that extend longitudinally and third and fourth edges 66C, 66D that extend in the height dimension. Each of the bands 26A, 26B includes chamfers 70 that interconnect the edges 66A, 66C, 66B, 66D and that form approximately 45 degree angles with each adjoining edge 66A-66D.

The edges 66A, 66B of bands 26A are linear, i.e., straight, their entire lengths. However the edges 66A, 66B of bands 26B are characterized by two concave segments 74A, 74B, 74C, 74D that interrupt the linearity of the edges 66A, 66B. In the embodiment depicted, segments 74A-D are arc-shaped. Segment 74A is directly opposite segment 74C so that segments 74A and 74C cooperate to define a narrow segment 78 of the band 26B. Similarly, segment 74B is directly opposite segment 74D so that segments 74B and 74D cooperate to define a narrow segment 82 of the band 26B.

Figure 8:
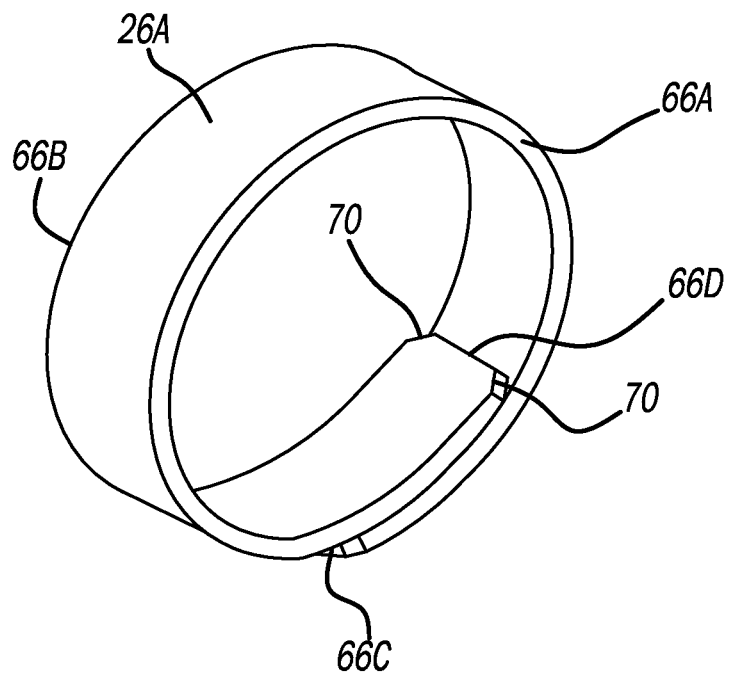
FIG. 8 is a schematic, perspective view of one of the bistable bands.

As understood by those skilled in the art, bistable bands are characterized by two stable shapes. A shape is "stable" if the bistable band 26A, 26B maintains the shape without external forces being applied. One of the stable shapes is substantially linear, as shown in FIGS. 5-7, and the other stable shape is coiled, as shown in FIG. 8. In the linear shape, the bistable bands 26A, 26B store potential energy. The stored potential energy is released when the linear shape is disturbed, such as by applying sufficient force to one surface of the bistable band; the released potential energy causes the bistable band to move into its coiled position.

The bistable bands 26A, 26B may include any of the features or characteristics of the bistable elements shown and disclosed in U.S. Pat. No. 8,506,158, issued Aug. 13, 2013 to Keung et al; U.S. Patent Application Publication No. 2014/0128751, published May 8, 2014; U.S. Patent Application Publication No. 2015/0119963, published Apr. 30, 2015; each of the foregoing patents and patent application publications being hereby incorporated by reference in their entireties.

Accordingly, each band 26A, 26B has a respective first stable shape that is substantially linear, as shown in FIGS. 5-7, and a second stable shape that is coiled, as shown in FIG. 8. FIG. 8 schematically depicts one of the bands 26A. In the coiled shape, the band 26A forms a circle or loop. The bands 26A, 26B are stacked together as best shown in FIGS. 5 and 7 such that the bands 26A, 26B are parallel to one another in both the linear and coiled stable shapes, and such that their spring forces are cumulative when the bands 26A, 26B release their potential energy in moving from their linear shapes toward their coiled shapes. The segments 74A-D and their resultant narrow segments 78, 82 provide the bands 26B with enhanced flexibility to wrap around the tree 18 or other object.

In the embodiment depicted, the stack of bands 26A, 26B within the housing 30 includes three of bands 26A and two of bands 26B; bands 26A are sandwiched between the two bands 26B. Other combinations of bands 26A, 26B may be employed within the scope of the claimed invention. It should be noted that, although five bands 26A, 26B are used in the embodiment depicted, more or fewer bands may be desirable depending on the particular application, and thus more or fewer bands may be employed within the scope of the claimed invention.

Figure 9:
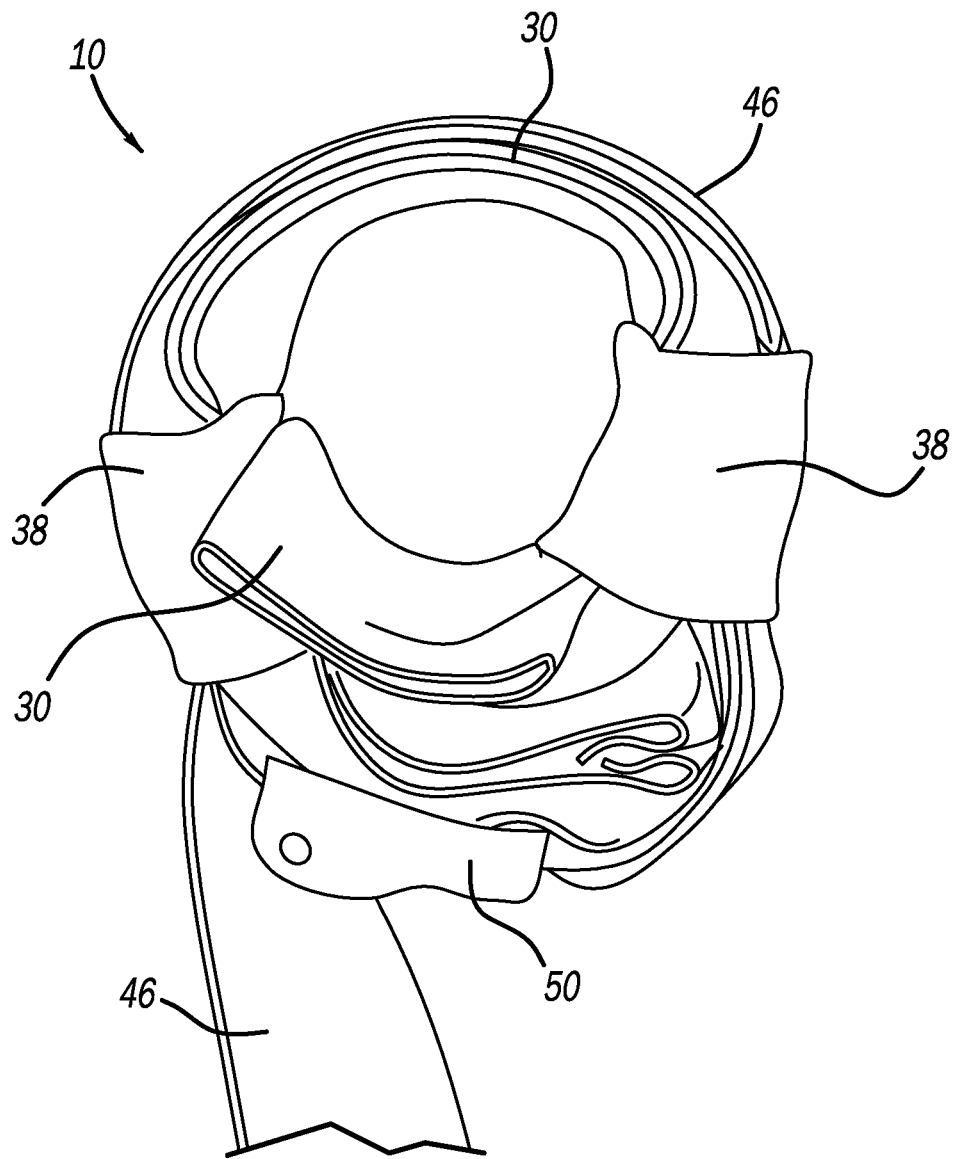
FIG. 9 is a schematic, top view of the mounting apparatus in a coiled stable shape.
Figure 10:
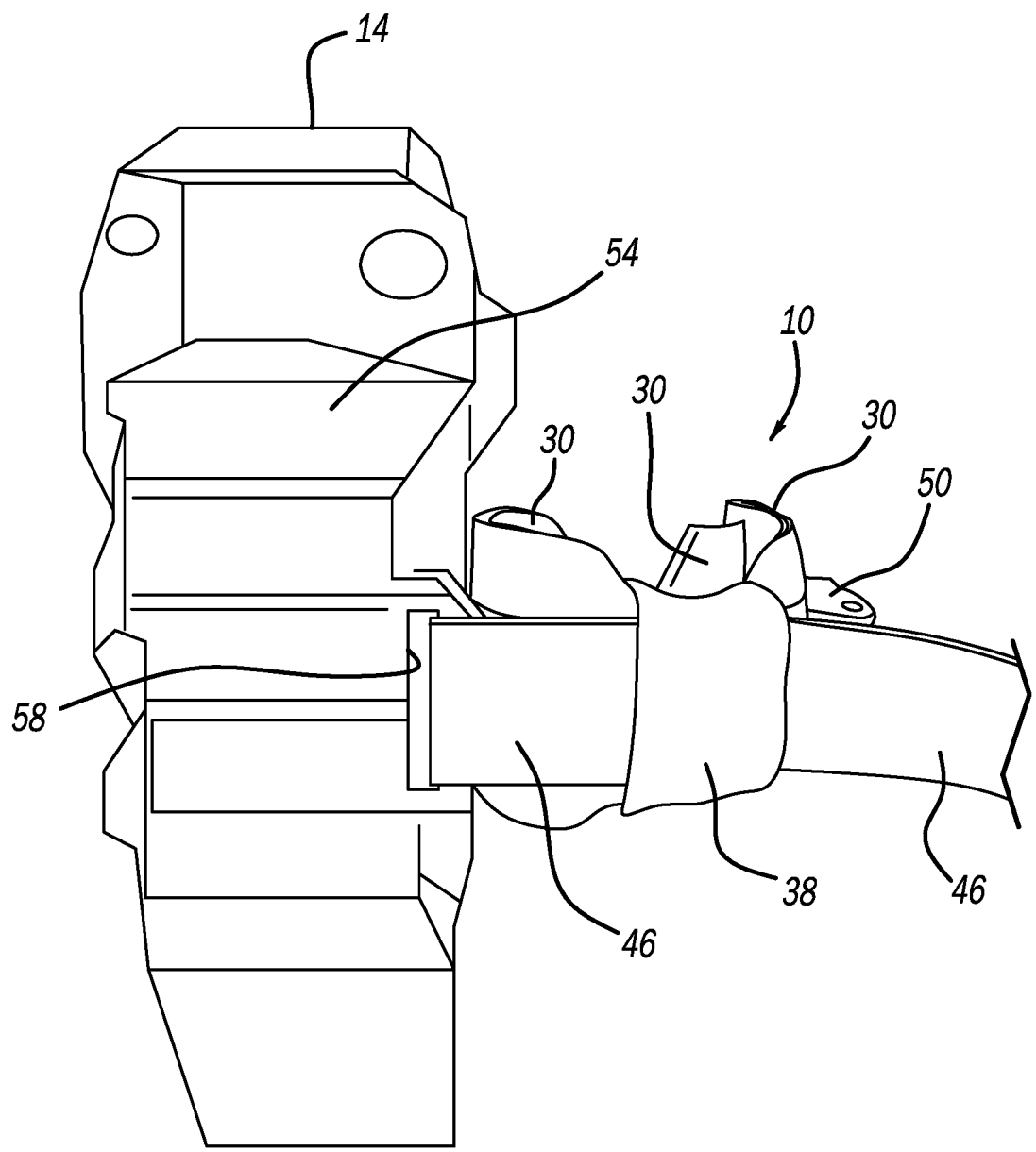
FIG. 10 is a schematic, side view of the mounting apparatus in the coiled stable shape with the trail camera attached thereto.
Figure 11:
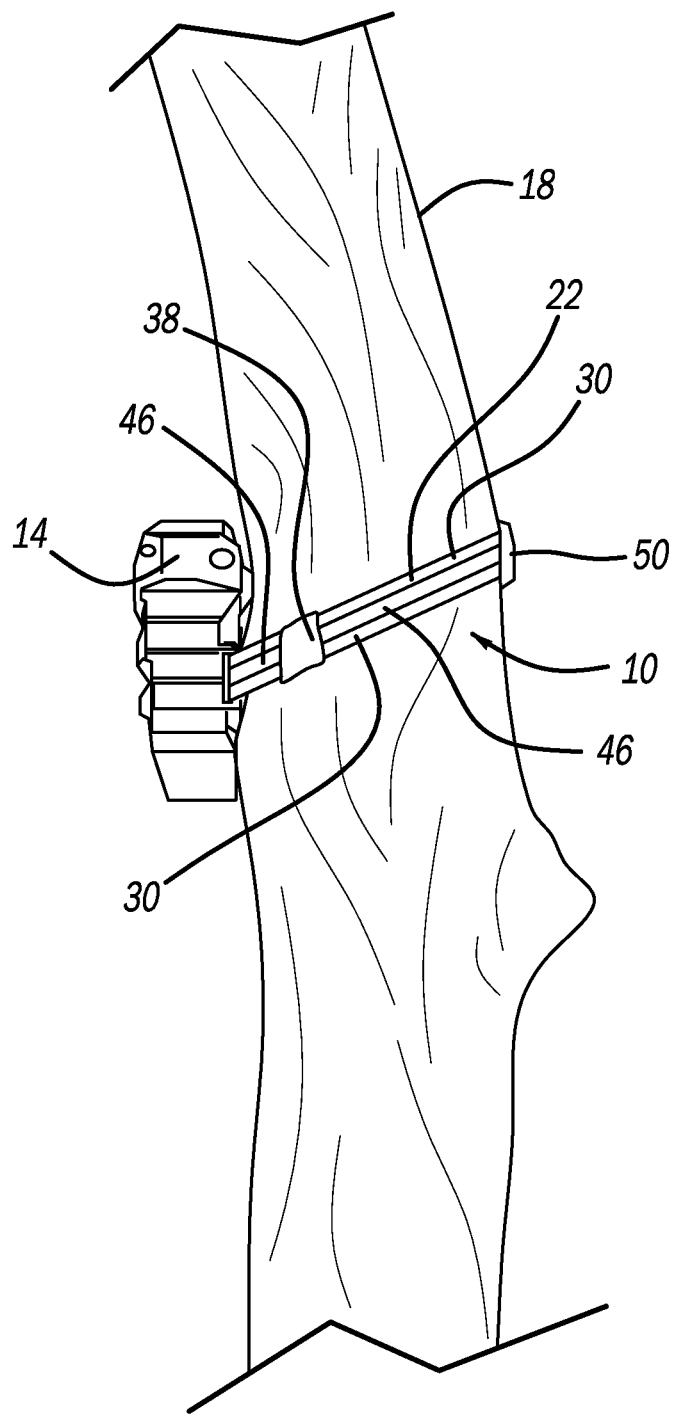
FIG. 11 is a schematic, side view of the mounting apparatus engaged with a tree and supporting the trail camera.

The flexibility of the cover 30 and the strap 46 are such that the mechanical behavior of the bistable bands 26A, 26B is imparted to the apparatus 10 as a whole, and the apparatus is thus characterized by first and second stable shapes, with the first stable shape of the apparatus 10 being linear, as shown in FIGS. 1-5, and the second stable shape of the apparatus 10 being coiled, as shown in FIGS. 9-11.

The apparatus 10 provides an effective, rapid, and easy way to mount the trail camera 14 to a tree, fence, pole, etc. A method of using the apparatus 10 may include attaching the camera 14 to the apparatus 10. Attaching the camera 14 to the apparatus may include extending one end of the strap 46 through one of the loops 38, then extending the end of the strap 46 through the slots 58 of the housing 54, and then extending the end of the strap 46 through the other of the loops 38. Other methods and techniques for connecting the camera 14 to the apparatus 10 may be employed within the scope of the claimed invention.

With the camera 14 attached and the apparatus 10 in its first stable shape, the method includes placing the apparatus 10 in contact with an object, such as the tree shown at 18 in FIG. 10. The method also includes exerting force on the stack of bistable bands 26A, 26B so that the bistable bands 26A, 26B move from their respective linear stable shapes toward their respective coiled stable shape. Exerting force on the stack of bistable bands 26A, 26B may include pressing on the cover 30 adjacent each of the loops 38 so that the cover transmits the forces to the bands; the stacking of the bands results in the forces applied adjacent the loops 38 to cause all of the bands 26A, 26B in the stack to move toward their respective coiled shapes.

The action of the bands 26A, 26B moving toward their respective coiled shapes causes the apparatus 10 as a whole to move toward its coiled shape, which in turn causes the apparatus 10 to coil around the tree 18. The bistable spring force from the bands 26A, 26B causes the apparatus 10 to exert a compressive force on the tree 18, which acts to retain the apparatus 10 and camera 14 on the tree.

The method may also include extending one end of the strap 46 through the cam buckle 50 so that the strap 46 forms a loop that encircles the tree 18. The strap 46 is cinched so that the strap 46 also exerts a compressive force on the tree 18, and the cam buckle 50 is actuated to latch the strap 46 in its looped and cinched position.

While the best modes for carrying out the disclosure have been described in detail, those familiar with the art to which this disclosure relates will recognize various alternative designs and embodiments for practicing the disclosure within the scope of the appended claims.

The invention claimed is:

1. An apparatus for attaching a camera to a tree or other object, the apparatus comprising:
   a plurality of bistable bands arranged parallel to one another;
   a flexible cover enclosing the plurality of bistable bands;
   each of said bistable bands having respective first and second mechanically stable shapes, said first mechanically stable shape being substantially linear and said second mechanically stable shape being arcuate or coiled;
   each of said bistable bands having a spring force when moving from the first mechanically stable shape to the second mechanically stable shape;
   said cover and plurality of bands being arranged such that the spring forces of said plurality of bistable bands are cumulative.

2. The apparatus of claim 1, further comprising first and second loops operatively connected to the cover; and
   a strap extending through the first and second loops for attaching the camera.

3. The apparatus of claim 1, wherein the camera defines at least one slot; and
   wherein the strap is extendable through said at least one slot.

4. The apparatus of claim 2, further comprising a cam buckle mounted to the strap.

5. The apparatus of claim 1, wherein at least one of said bistable bands has upper and lower edges having concave segments.

6. The apparatus of claim 5, wherein the concave segments are arcuate segments.

7. A method comprising:
   possessing an apparatus having a plurality of bistable bands arranged parallel to one another, a flexible cover enclosing the plurality of bistable bands, each of said bistable bands having respective first and second mechanically stable shapes, said first mechanically stable shape being substantially linear and said second mechanically stable shape being arcuate or coiled;
   placing the apparatus against an object with the bands in their first mechanically stable shape; and
   exerting sufficient force on the cover such that said bistable bands move from their respective first mechanically stable shape toward their respective second mechanically stable shape, thereby causing the apparatus to coil around the object and exert a compressive force on the object.

8. The method of claim 7, further comprising attaching a camera to the apparatus.

9. The method of claim 7, wherein the apparatus includes first and second loops operatively connected to the cover; and
   a strap that extends through the first and second loops.

10. The method of claim 9, wherein the camera includes a housing defining slots; and
    wherein the method includes extending the strap through the slots.

11. The method of claim 10, further comprising cinching the strap around the object.

12. The method of claim 11, wherein the object is a tree.

13. The method of claim 7, wherein at least one of said bistable bands has upper and lower edges having concave segments.

\* \* \* \* \*